Figure 1:
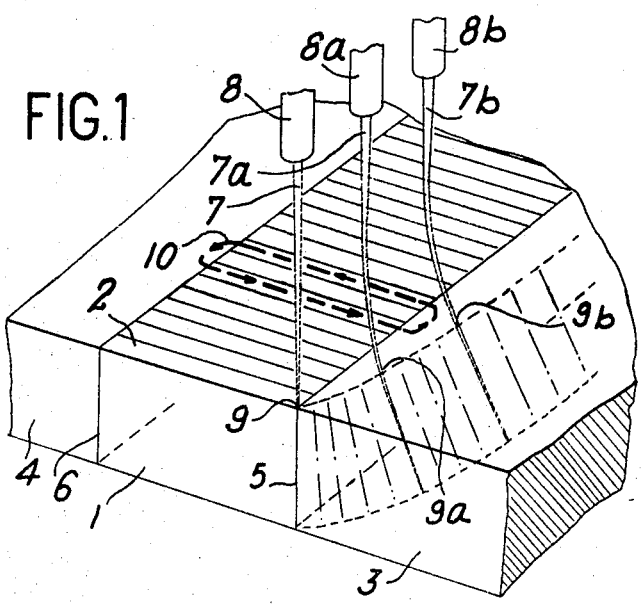

[15] 3,663,794
[45] May 16, 1972 de Cachard et al.

[54] METHOD OF ELECTRON BEAM WELDING

[72] Inventors: Maurice de Cachard, Legorget 38, La Tronche; Jean-Louis Georges, 2 rue Paul Valery 38, Grenoble, both of France

[22] Filed: May 4, 1971

[21] Appl. No.: 140,211

[30] Foreign Application Priority Data

May 29, 1970 France....................7019861

[52] U.S. Cl. ...................................219/121 EM
[51] Int. Cl. .........................................B23k 9/00
[58] Field of Search........219/121 R, 121 L, 121 PL, 121 EB, 219/121 EM, 131 R, 137, 123, 74

[56] References Cited

UNITED STATES PATENTS 3,226,527   12/1965   Harding..................................219/384
2,746,420   5/1956   Steigerwald..............................118/8

Primary Examiner—J. V. Truhe
Assistant Examiner—Gale R. Peterson
Attorney—Cameron, Kerkam & Sutton

[57] ABSTRACT

Three adjacent metallic blocks comprising two lateral blocks fabricated from a metal which is different from the central block are joined together by forming weld fillets simultaneously along the two joint planes by means of two electron guns which are displaced in parallel motion respectively along each plane.

3 Claims, 2 Drawing Figures

Patented May 16, 1972  3,663,794

METHOD OF ELECTRON BEAM WELDING

This invention relates to a method for performing welds by the electronic beam welding process, especially for joining the contacting faces of metallic blocks which are of different nature and more particularly although not exclusively between a central block formed by means of an assembly of contiguous strips or plates of constantan and two blocks of copper which are located on each side of the central block.

The application of the conventional method of welding by means of an electron beam delivered by an electron gun displaced in the direction of the contact face between two blocks of different nature and especially of copper and constantan which are to be assembled together is attended by a number of disadvantages; the most serious of these arises from a complex and progressive deviation of the beam and consequently of the weld fillet which is formed, whereupon the electron beam penetrates very rapidly into the copper block on one side of the joint to be welded. Experience has also demonstrated the fact that said deviation takes place as soon as the beam passes into the joint plane between the two blocks and progressively increases as the beam is displaced.

This invention is directed to a novel method of electronic beam welding which circumvents these disadvantages while permitting the formation of weld fillets which accurately follow the joint planes between the metallic blocks to be assembled.

To this end and in order to carry out the assembly of three adjacent metallic blocks in which the central block differs in nature from the two lateral blocks, the method according to the invention consists in forming weld fillets simultaneously along the two joint planes which separate the three blocks by means of two electron guns which are displaced in parallel motion respectively along each of said planes. As an advantageous feature and in order to prevent mutual repulsion of the electron beams delivered by the two guns, a flat anode is placed between the two beams and located parallel to the direction of said beams in equidistant relation thereto.

In the accompanying drawings, FIG. 1 illustrates diagrammatically the result which is obtained when two metallic blocks having different compositions are welded by means of a single electron gun in accordance with the conventional method. In this figure, the reference numeral 1 designates the central block which is constituted in particular by means of an assembly of contiguous strips of a predetermined metal and more particularly of constantan whilst the reference numerals 3 and 4 designate two copper blocks which are placed on each side of the central block 1 and form together with this latter contacting faces or joint planes which are designated respectively by the reference numerals 5 and 6.

Welding of the blocks 1 and 3 by means of the conventional electronic beam process accordingly consists in employing an electron beam 7 delivered by an electron gun 8 at right angles to the opposite surface of the two blocks 1 and 3, said electron gun 8 being intended to be driven in a movement of displacement along the joint plane 5, for example, along which one of the desired weld fillets is to be formed. As soon as the fillet is started or at the time of initial impact 9 of the beam with the plane 5, the penetration of electrons heats the metal and brings this latter to its melting point almost immediately. A hot point is thus formed in this precise location and in fact constitutes a thermocouple "hot weld" by virtue of the nature of the blocks 1 and 3. On the other hand, the other points of contact between the constantan of the block 1 and the copper of the block 3 constitute "cold welds" or points at the same instant, all other things being equal. A thermoelectric effect is therefore produced between the hot and cold points which are thus formed at the contacting surfaces of the two blocks, thereby generating an electric current which, as shown diagrammatically by means of the dashed line 10 in the drawing, is readily closed from one constantan strip 2 to the next by means of the second copper block 4. The flow of said current therefore produces a magnetic field which, combined with the effect of the electric field produced by the electron beam itself, causes substantial deviation of said beam. In FIG. 1, the references 7a, 7b and 8a, 8b designate successive positions of the beam 7 and of the electron gun 8 in which it is shown that the corresponding point of impact 9, 9a and 9b of the beam progressively moves away from the joint plane 5 between the block 1 of constantan and the block 3 of copper.

The current 10 which is generated within the adjacent blocks can attain substantial values and exceed in particular several hundred amps with a beam acceleration voltage of the order of 10 kV and a power of 7 kW, the rate of transfer of the electron gun being of the order of 10 cm/sec. This results in a not-negligible deviation of the weld fillet and in defective assembly of the blocks.

It has in fact been proved by experience that the deviation of the fillet depends not only on the instantaneous current which is developed at the time of impact of the beam, this deviation being a priori constant, but also on the currents which are generated in a more or less random manner and result from localized heating of the parts, these currents being consequently essentially variable but progressively higher in value as a function of the temperature, which explains the progressive deviation of the beam.

Figure 2:
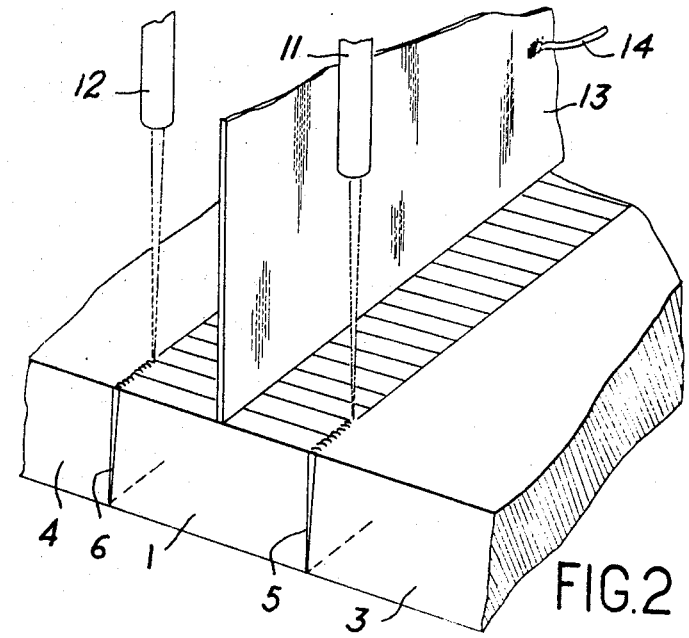

FIG. 2 illustrates the manner in which the improvement according to the invention makes it possible to overcome the disadvantage which has been referred-to in the foregoing. In this figure, there is illustrated as in the previous case the central block 1 of constantan placed between two copper blocks 3 and 4, these three blocks being intended to be welded together respectively along the joint planes 5 and 6. To this end, two separate electron guns 11 and 12 are employed and displaced in parallel so as to follow respectively the joint planes 5 and 6. Under these conditions, the extremities of each strip 2 of constantan are continuously brought to the same temperature. The difference between these latter is therefore zero and the current which is generated within the strip during welding is also zero, thereby preventing any interaction with the beams themselves.

Moreover, and in accordance with another useful property of the invention, it is an advantage to mount between the two electron guns 11 and 12 a flat anode 13 which is located at right angles to the surface of the central block 1 at an equal distance from the beams produced by the two electron guns. Said anode is connected to a suitable voltage source by means of the lead wire 14 and prevents mutual repulsion of the two beams relative to each other progressively as the electron guns are displaced.

The method under consideration thus makes it possible to form rectilinear weld fillets along joint planes of substantial length. The method therefore proves particularly useful within the scope of the application under consideration and for the purpose of welding metallic blocks having a different nature and between which temperature differences are liable to occur during the welding operation, thereby giving rise to a harmful thermoelectric effect.

It will clearly be understood that the invention is not limited solely to the example of application which has been more especially considered in the foregoing but extends on the contrary to all alternative forms.

What we claim is:

1. A method of electron beam welding of three adjacent metallic blocks in which the central block differs in nature from the two lateral blocks creating a thermocouple and current upon heating, consisting of the steps of forming weld fillets simultaneously along the two joint planes which separate the three blocks by means of two electron guns displaced in parallel motion respectively along each of said planes whereby no thermocouples are created and no current is generated in the blocks during welding.

2. A method in accordance with claim 1, including the step of placing a flat anode between the two beams, said anode being parallel to the direction of said beams and located in equidistant relation thereto.

3. A method in accordance with claim 1, the central block being contiguous strips of constantan and the two lateral blocks being copper.

* * * * *